US009250053B2

(12) United States Patent  (10) Patent No.: US 9,250,053 B2
Hirano et al.  (45) Date of Patent: Feb. 2, 2016

(54) SURFACE ROUGHNESS MEASURING UNIT AND COORDINATE MEASURING APPARATUS

(71) Applicant: MITUTOYO CORPORATION, Kanagawa (JP)

(72) Inventors: Kotaro Hirano, Kure (JP); Nobuyuki Hama, Higashihiroshima (JP); Masanori Arai, Kawasaki (JP); Sadayuki Matsumiya, Sagamihara (JP)

(73) Assignee: MITUTOYO CORPORATION, Kanagawa (JP)

( * ) Notice: Subject to any disclaimer, the term of this patent is extended or adjusted under 35 U.S.C. 154(b) by 196 days.

(21) Appl. No.: 14/050,553

(22) Filed: Oct. 10, 2013

(65) Prior Publication Data

US 2014/0109422 A1  Apr. 24, 2014

(30) Foreign Application Priority Data

Oct. 18, 2012 (JP) ................................. 2012-230818

(51) Int. Cl.
| | |
|---|---|
| *G01B 5/004* | (2006.01) |
| *G01B 5/28* | (2006.01) |
| *G01B 5/012* | (2006.01) |
| *G01B 5/016* | (2006.01) |
| *G01B 7/02* | (2006.01) |
| *B82Y 35/00* | (2011.01) |
| *G01B 5/008* | (2006.01) |

(52) U.S. Cl.
CPC ................ *G01B 5/012* (2013.01); *G01B 5/016* (2013.01); *G01B 5/28* (2013.01); *G01B 7/023* (2013.01); *B82Y 35/00* (2013.01); *G01B 5/008* (2013.01)

(58) Field of Classification Search
CPC .......... G01B 5/28; G01B 5/012; G01B 5/008; G01B 21/04; G01B 21/045; B82Y 35/00
USPC ................................................. 73/105; 33/503
See application file for complete search history.

(56) References Cited

U.S. PATENT DOCUMENTS

| | | | | |
|---|---|---|---|---|
| 2,363,691 A | * | 11/1944 | Reason ............................ | 73/105 |
| 2,460,726 A | * | 2/1949 | Arndt, Jr. ......................... | 73/105 |
| 2,471,009 A | * | 5/1949 | Reason ............................ | 73/105 |
| 3,750,295 A | * | 8/1973 | Nordmann et al. .............. | 33/548 |
| 4,765,181 A | * | 8/1988 | Numoto et al. .................. | 73/105 |

(Continued)

FOREIGN PATENT DOCUMENTS

| | | |
|---|---|---|
| JP | S63-289410 A | 11/1988 |
| JP | H11-190621 A | 7/1999 |

(Continued)

*Primary Examiner* — Laura Martin
*Assistant Examiner* — Rhyan C Lange
(74) *Attorney, Agent, or Firm* — Greenblum & Bernstein, P.L.C.

(57) ABSTRACT

A surface roughness measuring unit according to the present invention includes a contact pin unit having a contact pin and a displacement detector, the contact pin being provided so as to project and retract through a through-hole of a skid and scanning and moving along a surface of a work piece, the displacement detector detecting displacement of the contact pin in a direction perpendicular to the work piece surface; a driver moving the contact pin unit forward and backward along the surface of the work piece; and a joint coupling the contact pin unit and the driver to a measurement head holder of a coordinate measuring system. The surface roughness measuring unit further includes a contact detector that detects contact of the skid on the surface of the work piece.

18 Claims, 7 Drawing Sheets

(56) References Cited

U.S. PATENT DOCUMENTS

| | | | |
|---|---|---|---|
| 5,321,894 A * | 6/1994 | Bury | 33/553 |
| 6,164,124 A * | 12/2000 | Fujii et al. | 73/105 |
| 6,397,667 B1 * | 6/2002 | Fujii et al. | 73/105 |
| 6,446,496 B1 * | 9/2002 | Fujii et al. | 73/105 |
| 8,359,908 B2 | 1/2013 | Yamada et al. | |
| 8,516,712 B2 | 8/2013 | Kumagai et al. | |
| 2006/0243035 A1 * | 11/2006 | Aoki | 73/105 |
| 2008/0121030 A1 * | 5/2008 | Dorrer et al. | 73/105 |
| 2009/0255139 A1 * | 10/2009 | Wallace et al. | 33/503 |
| 2012/0266475 A1 | 10/2012 | Nakayama et al. | |

FOREIGN PATENT DOCUMENTS

| | | |
|---|---|---|
| JP | 2006-201105 A | 8/2006 |
| JP | 2007-047014 A | 2/2007 |

* cited by examiner

SURFACE ROUGHNESS MEASURING UNIT AND COORDINATE MEASURING APPARATUS

CROSS-REFERENCE TO RELATED APPLICATIONS

The present application claims priority under 35 U.S.C. §119 of Japanese Application No. 2012-230813, filed on Oct. 18, 2012, the disclosure of which is expressly incorporated by reference herein in its entirety.

BACKGROUND OF THE INVENTION

1. Field of the Invention

The present invention relates to a surface roughness measuring unit and a coordinate measuring apparatus. More specifically, the present invention relates to a surface roughness measuring unit that can be attached to and used with a coordinate measuring apparatus.

2. Description of Related Art

A coordinate measuring apparatus is known for measuring a three-dimensional contour shape of a work piece (for example, Japanese Patent Laid-open Publication No. 2006-201105).

The coordinate measuring apparatus includes a measurement head having at a tip of a stylus a contact ball that makes contact with a work piece, a moving mechanism moving the measurement head three-dimensionally in X, Y, and Z-axis directions, and a host computer measuring and recording the movement of the measurement head. An example of a known measurement head is a touch probe that outputs a touch signal when a contact ball is pushed into a work piece by a certain amount.

There is also a case where surface roughness such as minute unevenness and undulation (may be referred to as surface texture) on a work piece surface is an object of measurement. Japanese Patent Laid-open Publication No. H11-190621 discloses a surface texture measuring device. The surface texture measuring device disclosed in Japanese Patent Laid-open Publication No. H11-190621 includes a contact pin unit that has a contact pin displaceable in a direction perpendicular to a work piece surface and a driver that moves the contact pin unit forward and backward along the work piece surface.

The contact pin unit includes the contact pin that measures a surface texture represented by surface roughness and a displacement detector that detects displacement of the contact pin. The surface texture measuring device moves the contact pin unit forward and backward along the work piece surface with the driver, and detects displacement of the contact pin at this time with the displacement detector. The surface texture measuring device then converts the displacement to an electric signal, and performs predetermined processing of the electric signal to obtain a measured value of roughness of the work piece surface.

SUMMARY OF THE INVENTION

When accuracy of processing on a work piece is measured, for example, surface roughness of the work piece may need to be measured in addition to a three-dimensional contour shape of the work piece. When both a contour shape and surface texture of the work piece are measured, until now, the contour shape of the work piece has been measured with a coordinate measuring apparatus, after which the work piece has been transferred from the coordinate measuring apparatus to a surface texture measuring device. Then, the surface roughness of the work piece surface has been measured with the surface texture measuring device. However, when such a transfer is required, more steps are involved, thereby drastically lowering measurement efficiency.

Japanese Patent Laid-open Publication No. S63-289410 describes a coordinate measuring device capable of measuring surface roughness of a work piece. Specifically, an idea of attaching a contact pin unit at a tip of a Z-spindle of the coordinate measuring device is disclosed.

In the technology described in Japanese Patent Laid-open Publication No. S63-289410, the contact pin unit is attached to the tip of the Z-spindle of the coordinate measuring device, and the Z-spindle of the coordinate measuring device is moved by a moving mechanism to drive the contact pin unit along the work piece surface. However, when the contact pin unit is driven by the moving mechanism of the coordinate measuring device, the contact pin unit inevitably oscillates in a direction perpendicular to a direction in which the contact pin unit travels because of vibration from the active coordinate measuring. In this case, considering resolution required to measure the surface roughness of the work piece, it is highly unlikely that a determination can be made as to whether a measurement result is surface roughness or an error due to the oscillation caused by the moving mechanism of the coordinate measuring device. In other words, when the contact pin unit measures surface roughness of a work piece, it is necessary to separate the contact pin unit from the moving mechanism of the coordinate measuring device. Thus, it is difficult to use the moving mechanism of the coordinate measuring device as a driver of the surface roughness measuring device. Moreover, there is another concern. When surface roughness is measured, the contact pin unit first needs to be properly set in a predetermined position on the work piece by use of the moving mechanism of the coordinate measuring device. However, even when the contact pin unit makes contact with a surface of the work piece, it is impossible to detect whether the contact pin unit has been properly set on the work piece surface, and thus the surface roughness cannot be properly measured. Therefore, surface roughness cannot be measured simply by attaching the contact pin unit at the tip of the Z-spindle of the coordinate measuring device.

The present invention has been devised in order to address the circumstances above, and the object of the present invention is to provide a surface roughness measuring unit that can be coupled to a coordinate measuring apparatus.

A surface roughness measuring unit according to the present invention includes a contact pin unit having a contact pin and a displacement detector, the contact pin being provided so as to project and retract through a through-hole of a skid and scanning and moving along a surface of a work piece, the displacement detector detecting displacement of the contact pin in a direction perpendicular to the work piece surface; a driver moving the contact pin unit forward and backward along the work piece surface; and a joint coupling the contact pin unit and the driver to a holder of a coordinate measuring device. The surface roughness measuring unit further includes a contact detector detecting contact of the skid on the surface of the work piece.

The present invention provides a surface roughness measuring unit that can be coupled to a coordinate measuring device.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

A main point of the present invention is a configuration of a surface roughness measuring unit that can be attached to and used with a coordinate measuring device. However, for convenience of description later, a configuration of a coordinate measuring system including the coordinate measuring device is first described.

Figure 1:
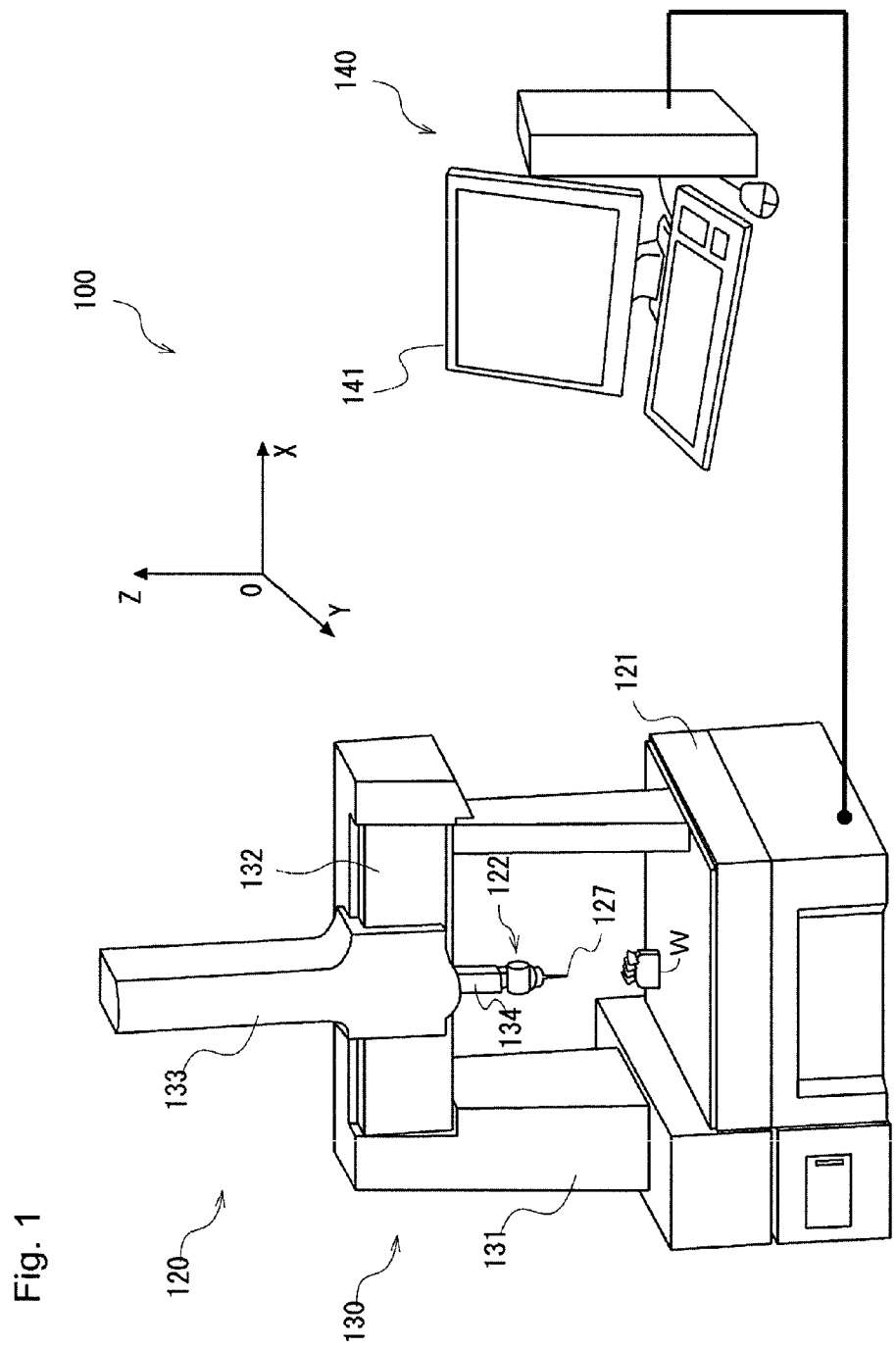
FIG. 1 is illustrates a configuration of a coordinate measuring system according to an embodiment 1.

FIG. 1 illustrates a configuration of a coordinate measuring system 100. The coordinate measuring system 100 includes a coordinate measuring device 120 and a computer terminal 140.

The coordinate measuring device 120 includes a stage 121 on which a work piece W is placed, a measurement head 122 that scans and measures a contour shape of the work piece W, and a moving mechanism 130 that moves the measurement head 122 three-dimensionally in X, Y, and Z-directions.

Herein, the measurement head 122 is shown with a touch sensor probe unit in which a contact ball 127 is provided at a tip of a stylus; however, the touch sensor probe may be changed to a different kind. (In descriptions later, explanation will be provided for a surface roughness measuring unit that can be used instead of the touch sensor probe unit.)

As shown in FIG. 1, an XYZ perpendicular coordinate system is defined as a machine coordinate system. An X-direction is a left-right direction in FIG. 1, a Y-direction is a front-back direction of a paper in FIG. 1, and a Z-direction is a top-bottom direction.

The moving mechanism 130 includes a gate-shaped frame 131, an X-slider 133, a Z-axis spindle 134, and a driving mechanism (not shown in the drawings). The gate-shaped frame 131 has a horizontal beam 132 bridging laterally in an X-axis direction and is capable of moving in a Y-axis direction.

The X-slider 133 has a column extended in a Z-axis direction and is capable of sliding in the X-axis direction along the horizontal beam 132. The Z-axis spindle 134 is inserted into an interior of the X-slider 133 and is slidable in the Z-axis direction.

The driving mechanism (not shown in the drawings) is configured with the gate-shaped frame 131, a motor that drives the X-slider 133 and the Z-axis spindle 134 in respective axis directions, and the like.

The touch sensor probe with the measurement head 122 is attached to a bottom end of the Z-axis spindle 134 and includes the contact ball 127. The coordinate measuring device 120 moves the measurement head 122 with the moving mechanism 130 and brings the contact ball 127 into contact with the work piece W to measure the shape of the work piece W.

As described above, a tip of a measurement head of the coordinate measuring system 100 is replaceable. For example, a touch sensor probe unit is used with the measurement head, and a contour shape of a work piece is measured first. Then, a surface roughness measuring unit is attached to the coordinate measuring system to replace the touch sensor probe unit. Surface roughness of the work piece is thus measured with the surface roughness measuring unit.

(First Embodiment)

A surface roughness measuring unit according to a first embodiment of the present invention is described. The surface roughness measuring unit can be coupled to the moving mechanism 130 of the coordinate measuring system 100 and used instead of the touch sensor probe. In the following, embodiments of the present invention are described with reference to the drawings.

Figure 2A:
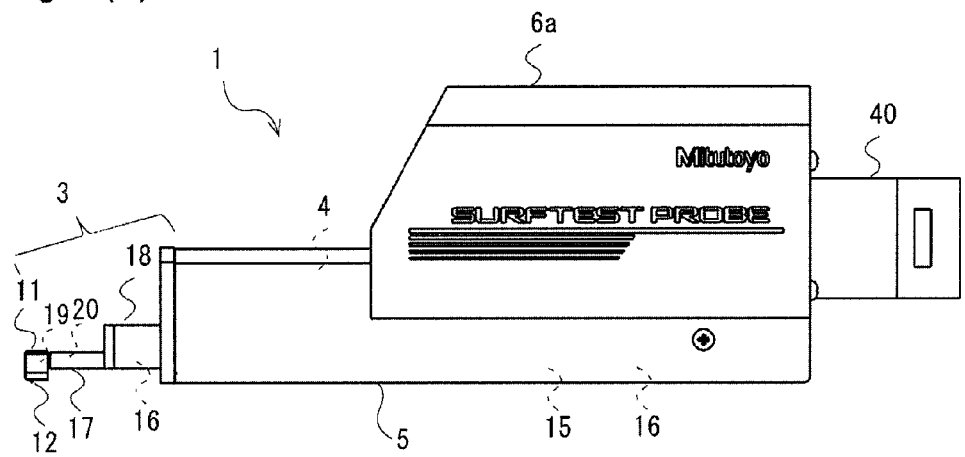
FIGS. 2(a), 2(b), and 2(c) illustrate an exterior appearance of a surface roughness measuring unit according to the embodiment 1.
Figure 2B:
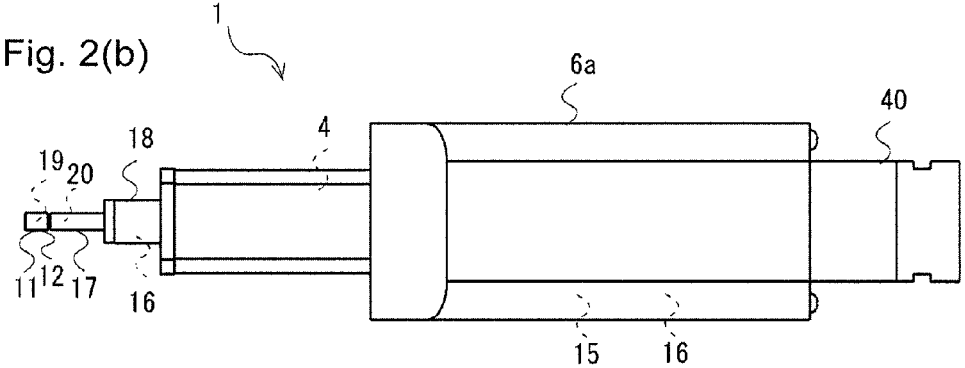
Figure 2C:
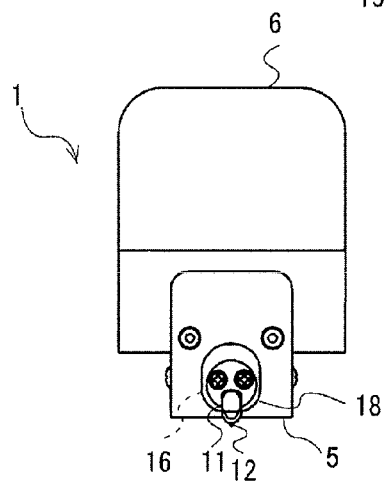

FIG. 2(a) is a side view of a surface roughness measuring unit 1. FIG. 2(b) is a top view of the surface roughness measuring unit 1. FIG. 2(c) is a front view of the surface roughness measuring unit 1.

The surface roughness measuring unit 1 includes a contact pin unit 3, a driver 4, a second supporter 6, and a joint 40. The surface roughness measuring unit 1 is coupled to the moving mechanism 130 (specifically, the bottom end of the Z-axis spindle) by the joint 40. (The second supporter 6 is connected to the joint 40 to link the contact pin unit 3 and the driver 4 to the joint 40. Details will be described later as a second embodiment).

Figure 3:
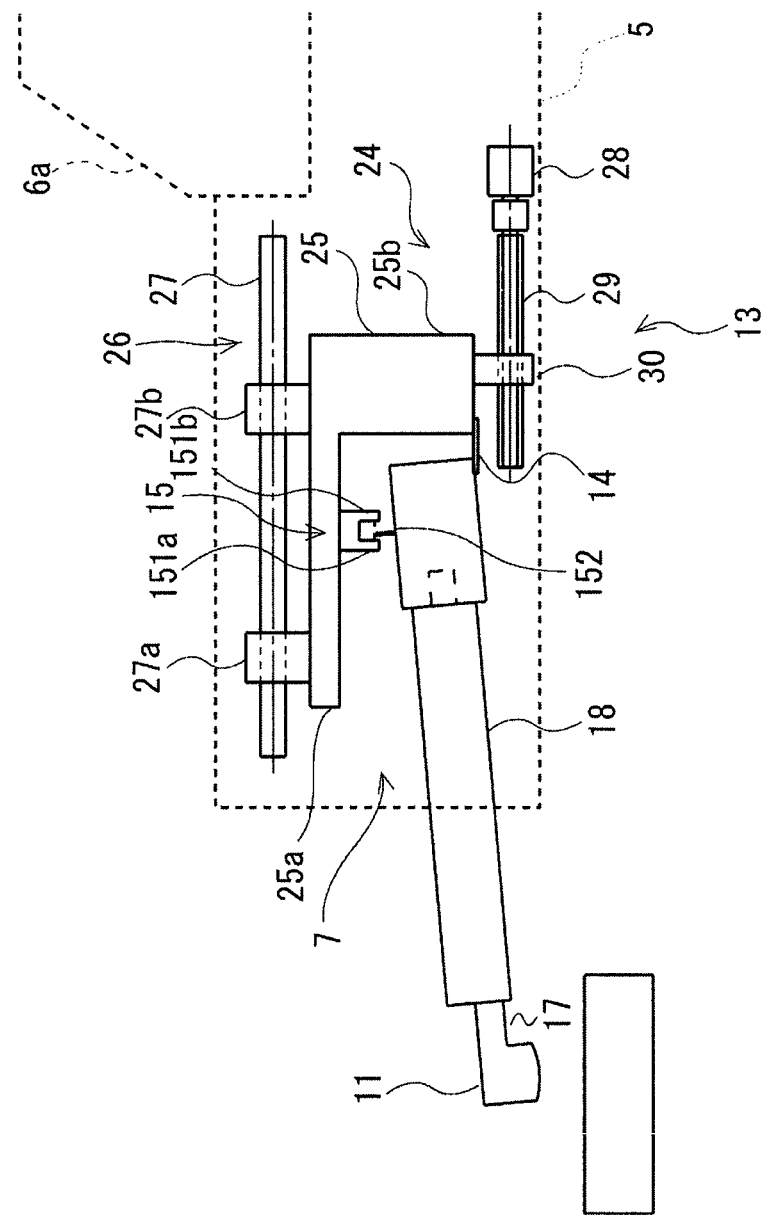
FIG. 3 illustrates an interior of a driver according to the embodiment 1.
Figure 4:
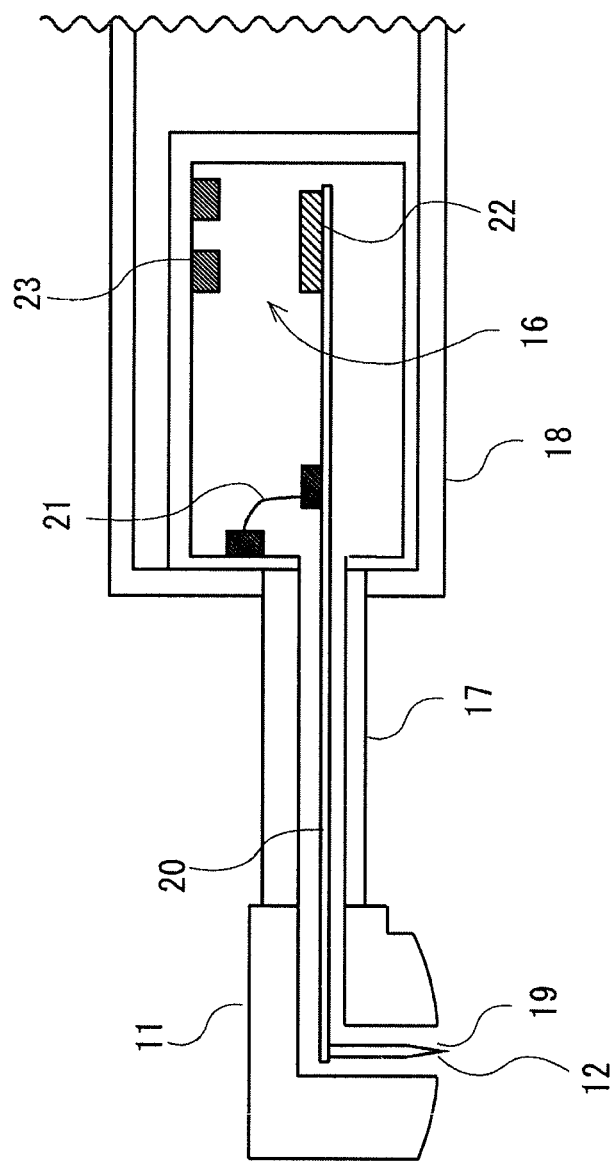
FIG. 4 illustrates a portion of a cross-section of a probe according to the embodiment 1.

FIG. 3 is a diagram to explain an internal mechanism of the driver 4. FIG. 4 is a diagram to explain an internal mechanism of the contact pin unit 3. The mechanism of the contact pin unit 3 is first described with reference to FIG. 4.

The contact pin unit 3 includes a casing body 18 having a space in an interior thereof, a contact pin lever 20 being oscillatable inside the casing body 18, and a displacement detector 16. The casing body 18 includes a substantially cylinder body and a nose 17 protruding from a front end of the body. Further, a skid 11 is provided to a tip of the nose 17.

The skid 11 has an L-shaped through-hole 19 in an interior thereof, the through-hole 19 connected to a hollow inside the nose 17.

The contact pin lever 20 includes, at a tip thereof, a contact pin 12 pointing downwardly. (For convenience of description, a top-bottom direction of the surface roughness measuring unit 1 is defined as a top-bottom direction shown on papers of FIG. 2a and FIGS. 3 to 6(b). Further, the left side of the papers represents a front side of the surface roughness measuring unit 1; the right side of the papers represents a rear side of the surface roughness measuring unit 1.) The contact pin lever 20 passes through the body and the nose 17. The contact pin 12 is provided to a tip of the contact pin lever 20 so as to face the exterior from an opening at a bottom end of the skid 11. A middle portion of the contact pin lever 20 is attached to the internal space of the body by a plate spring 21. The plate spring 21 serves as an oscillation point of the contact pin lever 20 and elastically supports the contact pin lever 20 such that the contact pin 12 is balanced in a state projecting slightly from a bottom surface of the skid 11.

The displacement detector 16 is provided in the interior of the body. The displacement detector 16 has a ferrite plate 22 and an inductance detector 23.

The ferrite plate 22 is attached on an upper surface at a rear end of the contact pin lever 20. The inductance detector 23 is attached in a position in the internal space of the body opposite to the ferrite plate 22.

The bottom surface of the skid 11 is a work piece contact surface that makes contact with the work piece W at a time of measurement. When the bottom surface of the skid 11 moves along a measured surface of the work piece W, the contact pin 12 moves up and down in accordance with surface roughness of the measured surface. When the contact pin 12 moves up and down, the inductance detector 23 detects this up-down movement. The inductance detector 23 outputs a detection signal, and the surface roughness of the measured surface of the work piece W is measured with the signal. The contact pin unit 3 externally outputs a result of measurement of the surface roughness of the measured surface of the work piece W.

Referring back to FIG. 3, the driver 4 is described next. FIG. 3 illustrates a mechanism of the driver 4. The driver 4 includes a first supporter 7, a driving mechanism 24, and a contact detector 15. Further, a driver casing 5 is shown with a dotted line.

The first supporter 7 includes an L-shaped frame 25, a coupler 14 that couples the contact pin unit 3 to the frame 25, and a guide 26 that restricts a movement direction of the frame 25.

The frame 25 is placed above the contact pin unit 3 and cantilevers a rear end of the contact pin unit 3. Herein, the frame 25 has a shape in which a component 25a is positioned so as to hover over an upper side of the contact pin unit 3 like a roof and a component 25b perpendicularly bends from the component 25a and faces the rear end of the contact pin unit 3.

The coupler 14 couples the rear end of the contact pin unit 3 to the component 25b. The coupler 14 here is a plate spring, specifically. The plate spring biases the contact pin unit 3 in a direction in which the contact pin unit 3 is separated from the component 25a when there is no other force exerted. As shown in FIG. 3, a front end of the contact pin unit 3 (namely, the skid 11) inclines so as to be lower than the rear end of the contact pin unit 3.

The guide 26 has a guiding shaft 27 and supports the frame 25 such that the frame 25 is capable of parallel movement. The guiding shaft 27 is inserted through holes of bearings 27a and 27b provided on an upper surface of the component 25a.

The driving mechanism 24 is configured with a motor 28, a feed screw 29, and a screw receiving nut 30. The screw receiving nut 30, into which the feed screw 29 is to be screwed, is provided on a bottom end surface of the component 25b. The feed screw 29 and the guiding shaft 27 are, of course, provided in parallel to each other.

The motor 28 is connected to a terminal end of the feed screw 29 that is screwed into the screw receiving nut 30. When the motor 28 is driven to rotate, the feed screw 29 moves in a direction parallel to the measured surface and the frame 25 moves along the guiding shaft 27.

Herein, descriptions are provided for a configuration in which the motor 28, the feed screw 29, and the screw receiving nut 30 are provided on a bottom surface side of the component 25b of the frame 25; however, the motor 28, the feed screw 29, and the screw receiving nut 30 may be provided on a side surface side or a top surface side of the frame 25.

Figure 5:
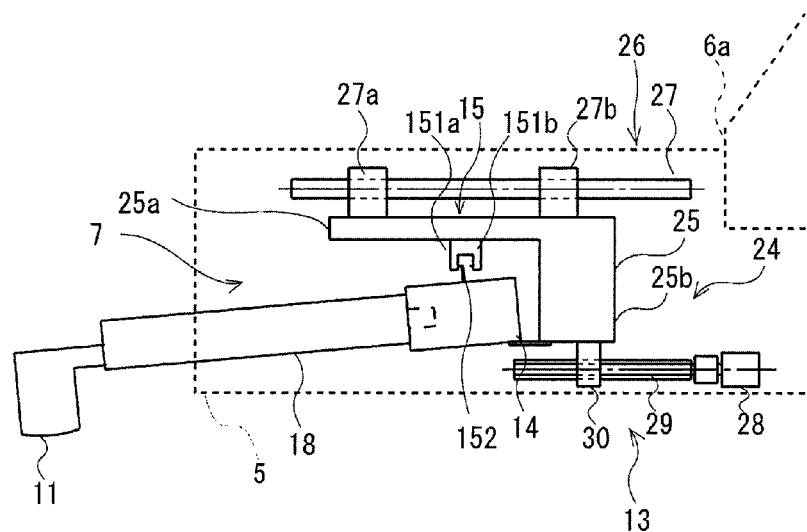
FIG. 5 illustrates a state in which the probe according to the embodiment 1 makes contact with a work piece.
Figure 5:
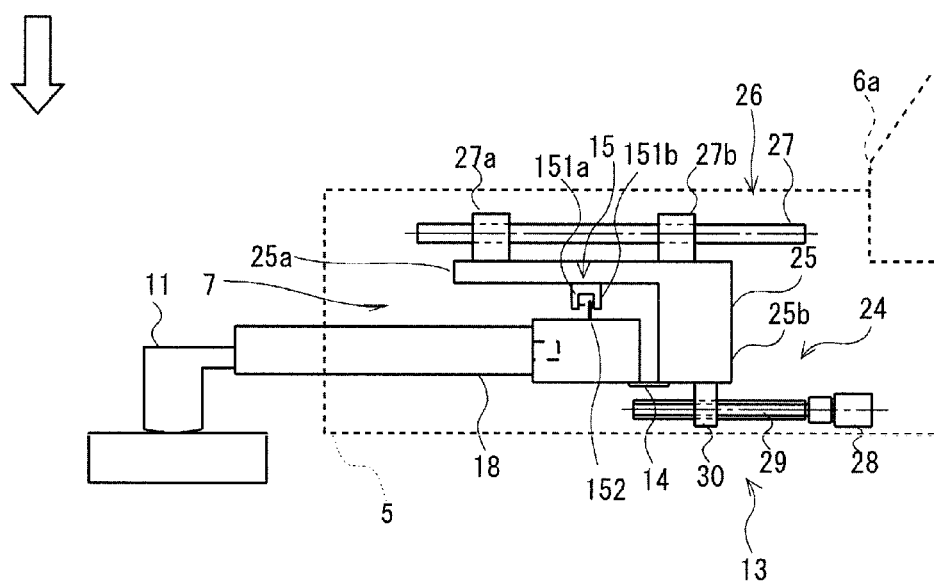

The contact detector 15 is provided between the contact pin unit 3 and the frame 25 to detect contact of the skid 11 on the work piece W. FIG. 5 illustrates a state in which the skid 11 (and further the contact pin 12) makes contact with the work piece W. The contact detector 15 is configured with a photosensor 151 and a shield plate 152, specifically.

The photosensor 151 is provided on a bottom surface of the component 25a and has a light emitter 151a and a light receiver 151b. The light emitter 151a emits light and the light receiver 151b receives light. When the light receiver 151b cannot receive light, it is possible to detect that there is an object blocking the light between the light emitter 151a and the light receiver 151b. Further, the shield plate 152 is provided in a position opposite to the photosensor 151 on a top surface of the casing body 18 of the contact pin unit 3.

In a state where the skid 11 is not making contact with the measured surface of the work piece W, the contact pin unit 3 is biased by the coupler 14 so that the skid 11 is lower than the rear end of the contact pin unit 3, as described above. In such a state, since the contact pin unit 3 and the component 25a are separated, the shield plate 152 does not block the light of the photosensor 151. On the other hand, when the skid 11 makes contact with the measured surface of the work piece W, the skid 11 is pushed up by the measured surface, and thus the contact pin unit 3 is pushed up. Accordingly, the top surface of the contact pin unit 3 and the bottom surface of the component 25a approach each other, and the shield plate 152 blocks the light of the photosensor 151. In this way, the photosensor 151 detects a slight change in tilt of the contact pin unit 3 caused by the skid 11 contacting the work piece W. When the contact detector 15 detects that the skid 11 has contacted the work piece W, the surface roughness measuring unit 1 outputs a detection result. Upon receiving this detection result, the moving mechanism 130 stops movement in a direction approaching the work piece W. Thereafter, the surface roughness measuring unit 1 starts to measure the surface roughness of the work piece W. In other words, the motor 28 is rotationally driven, and thus, the contact pin unit 3 is moved forward and backward along the surface of the work piece W.

The surface roughness measuring unit 1 according to the present embodiment is capable of detecting a slight change in tilt of the contact pin unit 3 caused when the skid 11 makes contact with the measured surface of the work piece W. Accordingly, although it is difficult to set the contact pin unit 3 in a proper position on the surface of the work piece W only by use of driving accuracy of the moving mechanism 130 of the coordinate measuring device 120, it becomes possible to have the skid 11 (and further the contact pin 12) properly make contact with the work piece W by use of the detection signal from the contact detector 15. Further, since the movement of the surface roughness measuring unit 1 by the moving mechanism 130 is stopped when the contact detector 15 detects the contact between the skid 11 and the work piece W, it is also possible to prevent an accident such as damage to a precision component like the skid 11. Moreover, since the contact detector 15 can accurately detect the contact between the work piece W and the skid 11, it is not necessary to slowly move the surface roughness measuring unit 1 toward the work piece W to avoid an accident. Thus, the measurement efficiency can be further improved. Another configuration is also possible in which the contact pin unit 3, serving as the contact detector 15, detects contact with the work piece W based on displacement of the contact pin 12. However, considering a measurement range and resolution of the displacement detector 16 of the contact pin unit 3, the contact pin unit 3 must move toward a work piece with considerable slowness. In this point, the contact pin unit of the present embodiment is not required to slowly move the surface roughness measuring unit 1 to the work piece W, and thus, the measurement efficiency can be further improved. Furthermore, since the measuring unit 1 of the present embodiment includes the driver 4 to drive the skid 11, driving of the moving mechanism 130 can be stopped when surface roughness is measured. Thus, an error in a surface roughness measurement result due to driving of the moving mechanism 130 does not occur. Therefore, the measuring unit 1 of the present embodiment can accurately detect surface roughness. Further, the measuring unit 1 of the present embodiment does not use the moving mechanism 130 of the coordinate measuring device to measure the surface roughness, and thus can be installed in other devices, such as a robot, a machine tool, and the like, for example.

(Second Embodiment)

The surface roughness measuring unit 1 of the present invention further includes a collision detector 50 in addition to the contact detector described in the first embodiment. The collision detector 50 detects that the surface roughness measuring unit 1, rather than the skid 11, has collided with an unexpected obstacle.

The contact pin unit 3 of the surface roughness measuring unit 1 needs to perform highly precise parallel displacement. Thus, a positional relationship among the skid 11, the guide 26, and the driving mechanism 24 is restricted to some extent, and theretofore, it is unavoidably difficult to secure a sufficient gap between the bottom end surface of the skid 11 and the bottom surface of the driver casing 5. For example, as shown in FIGS. 2(a) to 2(c), the bottom end of the skid 11 and the bottom surface of the driver casing 5 are often approximately level with each other. Thus, in a case where unevenness or a projection is left on the surface of the work piece W due to imperfect processing and the like, for example, when the surface roughness measuring unit 1 is brought closer to the surface of the work piece W in order to bring the skid 11 into contact with the surface of the work piece W, it is possible that the surface roughness measuring unit 1 itself, such as the bottom surface of the driver casing 5, may collide with a projection and the like before the skid 11 does.

Thus, when attempting to measure the work piece W with the surface roughness measuring unit 1 coupled to the moving mechanism 130, for example, the collision detector 50 prevents the surface roughness measuring unit 1 from being damaged by a projection (imperfect processing on the surface of the work piece W, for example) in a position that an operator does not expect.

Figure 6A:
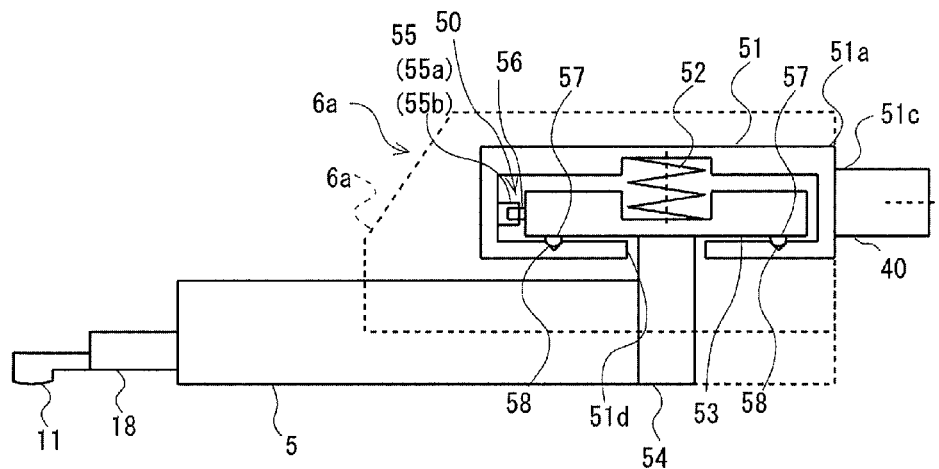
FIG. 6(a) illustrates a collision detector according to an embodiment 2.
Figure 6B:
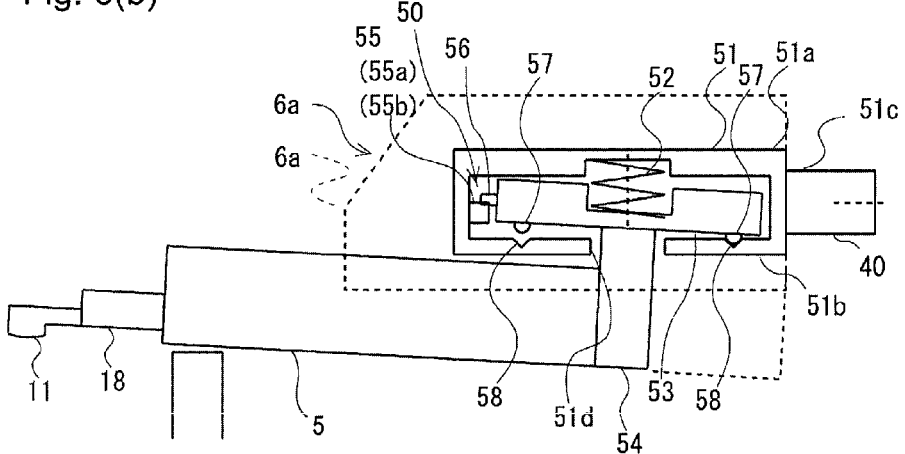
FIG. 6(b) illustrates the collision detector according to the embodiment 2.

FIGS. 6(a) and 6(b) illustrate a configuration of the second supporter 6. The second supporter 6 is provided inside an outer cover 6a.

The second supporter 6 includes a supporter casing 51, a coil spring 52, a support plate 53, a photosensor 55, and a shield plate 56. The collision detector 50 is configured with the photosensor 55 and the shield plate 56.

The supporter casing 51 is a housing having an interior hollow and is configured with a rectangular top plate 51a having a recess on a lower surface thereof, a rectangular bottom plate 51b having a hole 51d at a center thereof, and a wall 51c connecting a periphery of the top plate 51a and a periphery of the bottom plate 51b. A connecting member 54 connecting the driver casing 5 of the contact pin unit 3 to the support plate 53 is inserted into the hole 51d in the bottom plate 51b.

Figure 7:
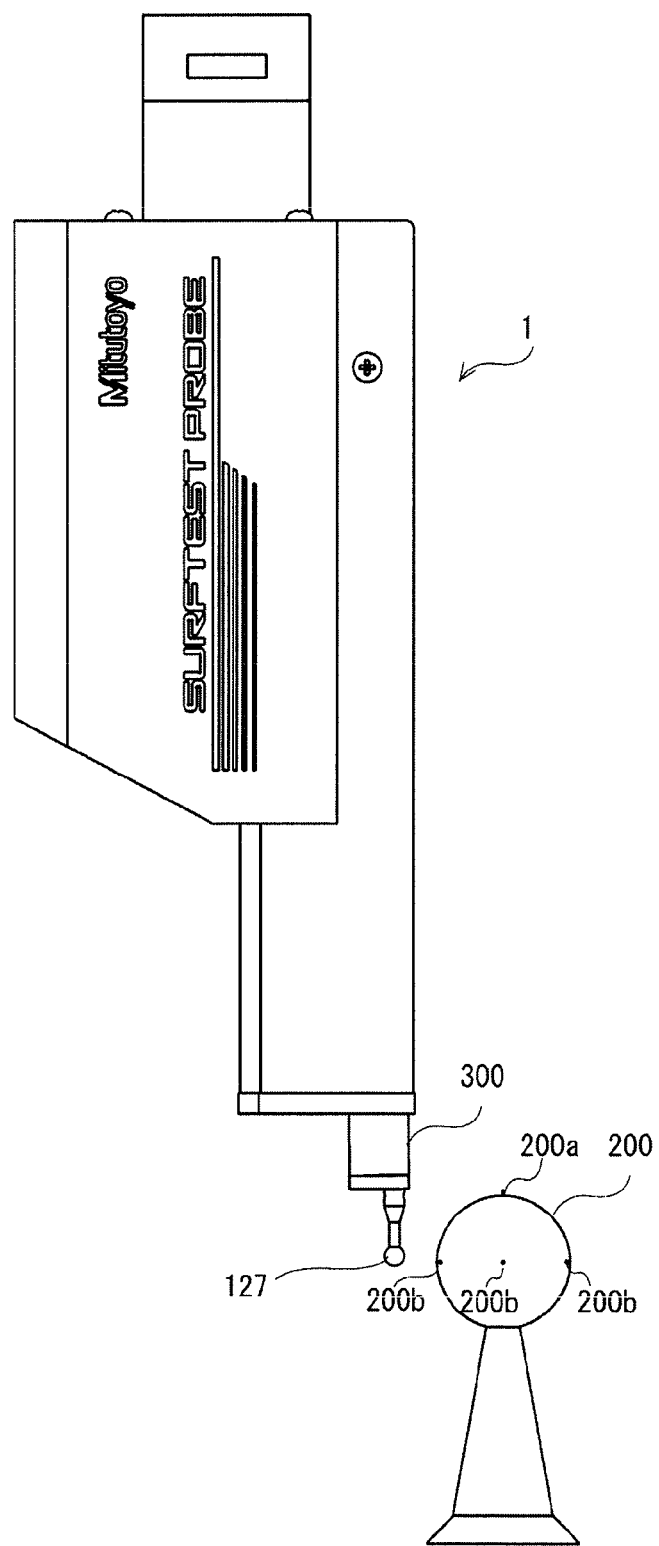
FIG. 7 illustrates a standard ball and a surface roughness measuring unit according to the embodiment 1.

The support plate 53 is rectangular and is held on the bottom plate 51b via three or more steel balls 57. (FIG. 7 should be interpreted as only having two steel balls 57 visible because FIG. 7 is a side view.) A plurality of receiving holes 58 are provided on an upper surface of the bottom plate 51b to receive the steel balls 57. The receiving holes 58 are provided to prevent the steel balls 57 from rolling and are cone-shaped recesses.

The top plate 51a, the bottom plate 51b, and the support plate 53 of the supporter casing 51 here were described as having rectangular shapes; however the shapes are not limited to this. These shapes may be circles, equilateral triangles, isosceles triangles, squares, and the like, for example. In other words, at least three steel balls 57 need to be provided to hold a surface of the supporter casing 51.

The support plate 53 is fixedly coupled to the connecting member 54 and tilts at the same angle in accordance with tilting of the driver casing 5.

The coil spring 52 is provided between the top plate 51a and the support plate 53. The support plate 53 is pressed against the bottom plate 51b by elastic force of the coil spring 52. A recess for insertion of the coil spring 52 is provided to each of a bottom surface of the top plate 51a and a top surface of the support plate 53. The support plate 53 settles on the bottom plate 51b with the bottom plate 51b serving as a receiver and the support plate 53 serving as a supporter.

The photosensor 55 is provided to the wall 51c. The photosensor 55 includes a light emitter 55a and a light receiver 55b. Light is emitted and received between the light emitter 55a and the light receiver 55b, and thereby, the photosensor 55 detects whether there is any object blocking the light between the light emitter 55a and the light receiver 55b. The shield plate 56 is provided to a side surface of the support plate 53 opposite to the photosensor 55 in the wall 51c. When the support plate 53 and the bottom plate 51b are in parallel, the shield plate 56 is provided so as to be inserted between the light emitter 55a and the light receiver 55b of the photosensor 55. FIG. 6(b) illustrates a state in which the driver casing 5 is in contact with an obstacle. When the obstacle makes contact with the bottom surface in a vicinity of a front end portion of the driver casing 5, the front end portion of the driver casing 5 is raised and the driver casing 5 tilts. At the same time that the driver casing 5 tilts, the support plate 53 connected to the driver casing 5 by the connecting member 54 tilts. Accordingly, the shield plate 56 inserted into the photosensor 55 is displaced, and a detection status of the photosensor 55 changes. Thus, it is possible to detect that the driver casing 5 has made contact with an external obstacle. Therefore, the surface roughness measuring unit 1 according to the present embodiment can detect contact with an external obstacle other than the measured surface. Further, when the collision detector 50 detects that the surface roughness measuring unit 1 collides with the unexpected obstacle as described above, movement of the surface roughness measuring unit 1 by the moving mechanism 130 is stopped. Thereby, it is possible to prevent an accident such as damage to the surface roughness measuring unit 1 due to collision with the unexpected obstacle.

(Calibration)

In the following, descriptions are provided regarding calibration for a case where the surface roughness measuring unit 1 is attached to and used with the coordinate measuring system 100. FIG. 7 illustrates the surface roughness measuring unit 1 and a standard ball 200. When the surface roughness measuring unit 1 is used, the surface roughness measuring unit 1 is first coupled to the moving mechanism 130, then offset calibration is performed with the standard ball 200 before measuring the shape of the work piece W.

For calibration, the above-described contact pin unit 3 is replaced with an offset calibration head 300 having the contact ball 127 at the tip thereof. The reasons for doing so are as follows. Although it is possible for the surface roughness measuring unit 1 to directly measure the standard ball 200, the standard ball 200 cannot be properly measured even when the skid 11 is brought into contact with a plurality of points on a surface of the standard ball 200 because the skid 11 of the surface roughness measuring unit 1 is not spherical. Thus, an offset value is biased. It is also possible to perform calibration with the biased offset value taken into consideration; however, it is not desirable because the bias is expected to differ depending on the standard ball 200 or measured points on the standard ball 200. Therefore, the offset calibration head 300 having the contact ball 127 at the tip thereof is preferably used for calibration.

When calibration is performed, the contact ball 127 approaches the standard ball 200 from one direction and is brought into contact with the standard ball 200. Thereby, a coordinate of a central point of the standard ball 200 is measured by the contact ball 127. (Since the surface roughness measuring unit 1 can sense a work piece from one direction only, approach from one direction is sufficient for measurement of the standard ball 200.) A difference between the coordinate of the central point of the standard ball 200 measured by the contact ball 127 and a coordinate of the central point of the standard ball 200 stored in the computer terminal 140 as a standard value is calculated, and thereby, the offset amount for the surface roughness measuring unit 1 is calibrated. Further, there is a dimensional difference between the contact ball 127 of the offset calibration head 300 and the skid 11 of the contact pin unit 3; however, this dimensional difference may be calibrated with a design value.

As described above, the surface roughness measuring unit 1 according to the present invention includes the contact detector 15 that detects contact of a measuring surface of the skid 11 on the work piece W. Thus, the surface roughness measuring unit 1 (namely, the skid 11) can be accurately set on the work piece W even using driving accuracy of the moving mechanism 130 of the coordinate measuring device 120.

Further, the surface roughness measuring unit 1 includes the collision detector 50. Thus, even when an obstacle not expected by the operator touches the bottom surface of the driver casing 5, for example, at the time the surface roughness measuring unit 1 is approaching a work piece, it is possible to detect collision with the obstacle immediately and to prevent damage to the surface roughness measuring unit 1.

The present invention is not limited to the embodiments above and may be modified as needed without departing from the scope of the invention. For example, although the coordinate measuring device having the gate-shaped frame has been described, the surface roughness measuring unit according to the present embodiments is, of course, also applicable to a coordinate measuring device having a multi joint moving mechanism. (A multi joint type coordinate measuring device is disclosed in Japanese Patent Laid-open Publication No. 2007-47014, for example.) Further, the surface roughness measuring unit has been described in which the contact pin and the contact pin lever are perpendicular to each other, for example. However, the internal structure of the contact pin unit itself is not limited, and a contact pin and a contact pin lever may be coupled in a straight line. Furthermore, the surface roughness measuring unit according to the present invention may be attached to and used with a robot, a machine tool, and the like. Photosensors have been used as examples for the contact detector 15 and the collision detector 50. However, specific configurations thereof are, of course, not limited to the examples in the present embodiments, and a mechanical contact switch may also be used.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A surface roughness measuring unit comprising:
   a contact pin unit comprising:
      a contact pin configured to project and retract through a through-hole of a skid during a scanning motion along a surface of a work piece; and
      a displacement detector configured to detect displacement of the contact pin in a direction perpendicular to the work piece surface;
   a driver configured to move the contact pin unit forward and backward along the work piece surface;
   a joint configured to couple the contact pin unit and the driver to a measurement head holder of a coordinate measuring device; and
   a contact detector configured to detect contact of the skid on the work piece surface, the contact detector comprising:
      a first sensor provided to one of the contact pin unit and the driver; and
      a second sensor provided to the other of the contact pin unit and driver in a position opposite the first sensor, wherein the first sensor is configured to detect one of proximity and contact to the second sensor.

2. The surface roughness measuring unit according to claim 1, wherein, when the skid makes contact with the work piece surface, the contact detector detects displacement of the contact pin unit relative to the driver in the direction perpendicular to the work piece surface.

3. The surface roughness measuring unit according to claim 2, wherein:
   the driver comprises a frame configured to move forward and backward along a guiding shaft via power from a motor, when the frame is being guided by the guiding shaft.

4. The surface roughness measuring unit according to claim 3, wherein the first sensor is a photosensor and the second sensor is a shield plate insertably and withdrawably provided between a light emitter and a light receiver of the photosensor.

5. The surface roughness measuring unit according to claim 1, further comprising a biaser configured to bias the contact pin unit in a first direction defined as a direction in which the contact pin emerges from the through-hole of the skid.

6. The surface roughness measuring unit according to claim 5, wherein:
the driver comprises a frame configured to move forward and backward; and
the contact pin unit is cantilevered on the frame by a coupler.

7. The surface roughness measuring unit according to claim 6, wherein the coupler is a plate spring configured to bias the contact pin unit in the first direction.

8. The surface roughness measuring unit according to claim 1, further comprising:
a receiver fixedly mounted to a housing; and
a supporter configured to be received by and separated from the receiver, wherein:
the driver is fixedly connected to the supporter,
the supporter is biased in the first direction by a second biaser configured to be received by the receiver, and
the driver is separated from the receiver when the driver receives force from a direction opposite the first direction, the first direction defined as the direction in which the contact pin emerges from the through-hole of the skid.

9. The surface roughness measuring unit according to claim 8, further comprising a sensor configured to that detect one of a state in which the supporter is received by the receiver and a state in which the supporter is separated from the receiver.

10. A coordinate measuring apparatus comprising:
the surface roughness measuring unit according to claim 1; and
a coordinate measuring device to which the surface roughness measuring unit is connected as a measurement head.

11. A coordinate measuring apparatus comprising:
the surface roughness measuring unit according to claim 2; and
a coordinate measuring device to which the surface roughness measuring unit is connected as a measurement head.

12. A coordinate measuring apparatus comprising:
the surface roughness measuring unit according to claim 3; and
a coordinate measuring device to which the surface roughness measuring unit is connected as a measurement head.

13. A coordinate measuring apparatus comprising:
the surface roughness measuring unit according to claim 4; and
a coordinate measuring device to which the surface roughness measuring unit is connected as a measurement head.

14. A coordinate measuring apparatus comprising:
the surface roughness measuring unit according to claim 5; and
a coordinate measuring device to which the surface roughness measuring unit is connected as a measurement head.

15. A coordinate measuring apparatus comprising:
the surface roughness measuring unit according to claim 6; and
a coordinate measuring device to which the surface roughness measuring unit is connected as a measurement head.

16. A coordinate measuring apparatus comprising:
the surface roughness measuring unit according to claim 7; and
a coordinate measuring device to which the surface roughness measuring unit is connected as a measurement head.

17. A coordinate measuring apparatus comprising:
the surface roughness measuring unit according to claim 8; and
a coordinate measuring device to which the surface roughness measuring unit is connected as a measurement head.

18. A coordinate measuring apparatus comprising:
the surface roughness measuring unit according to claim 9; and
a coordinate measuring device to which the surface roughness measuring unit is connected as a measurement head.

* * * * *